Aug. 13, 1968  R. H. JENSEN  3,396,678
PALLET CONSTRUCTION
Filed May 3, 1967
2 Sheets-Sheet 1
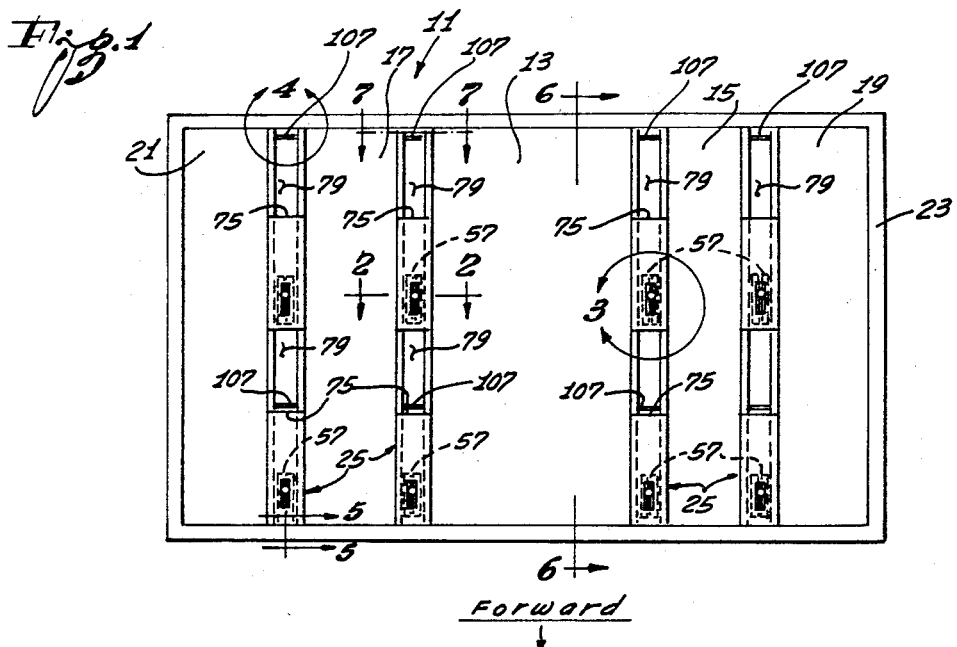
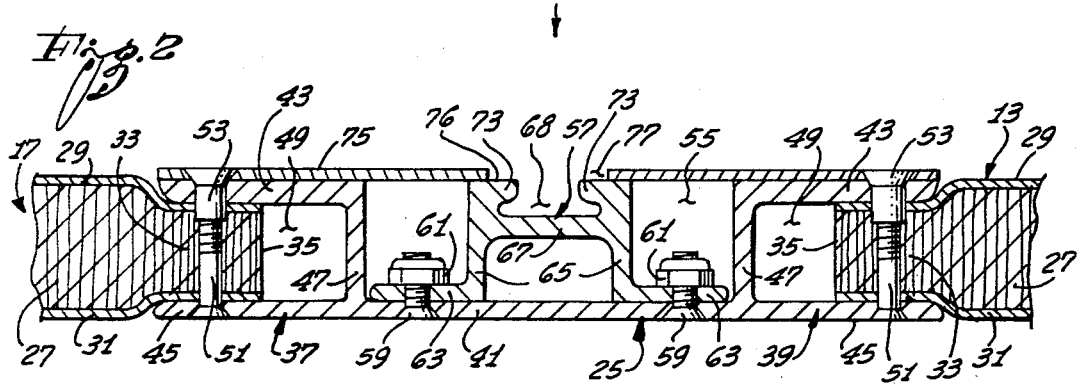
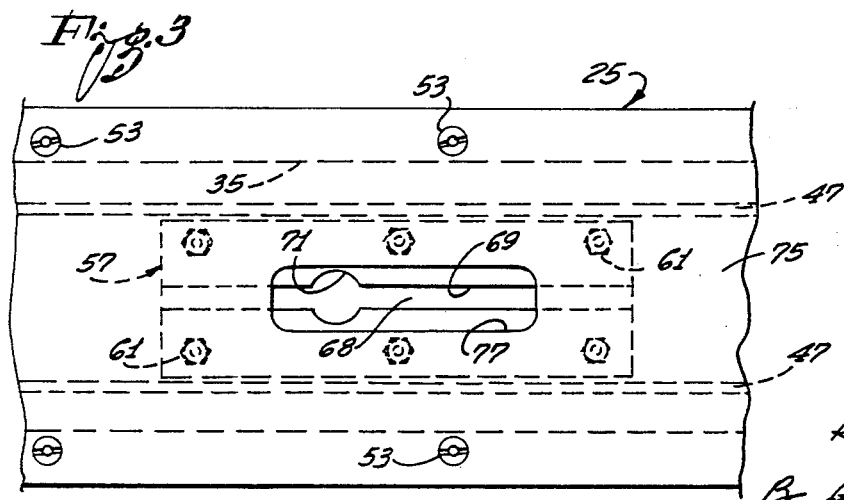
INVENTOR:
Richard H. Jensen
ATTORNEYS

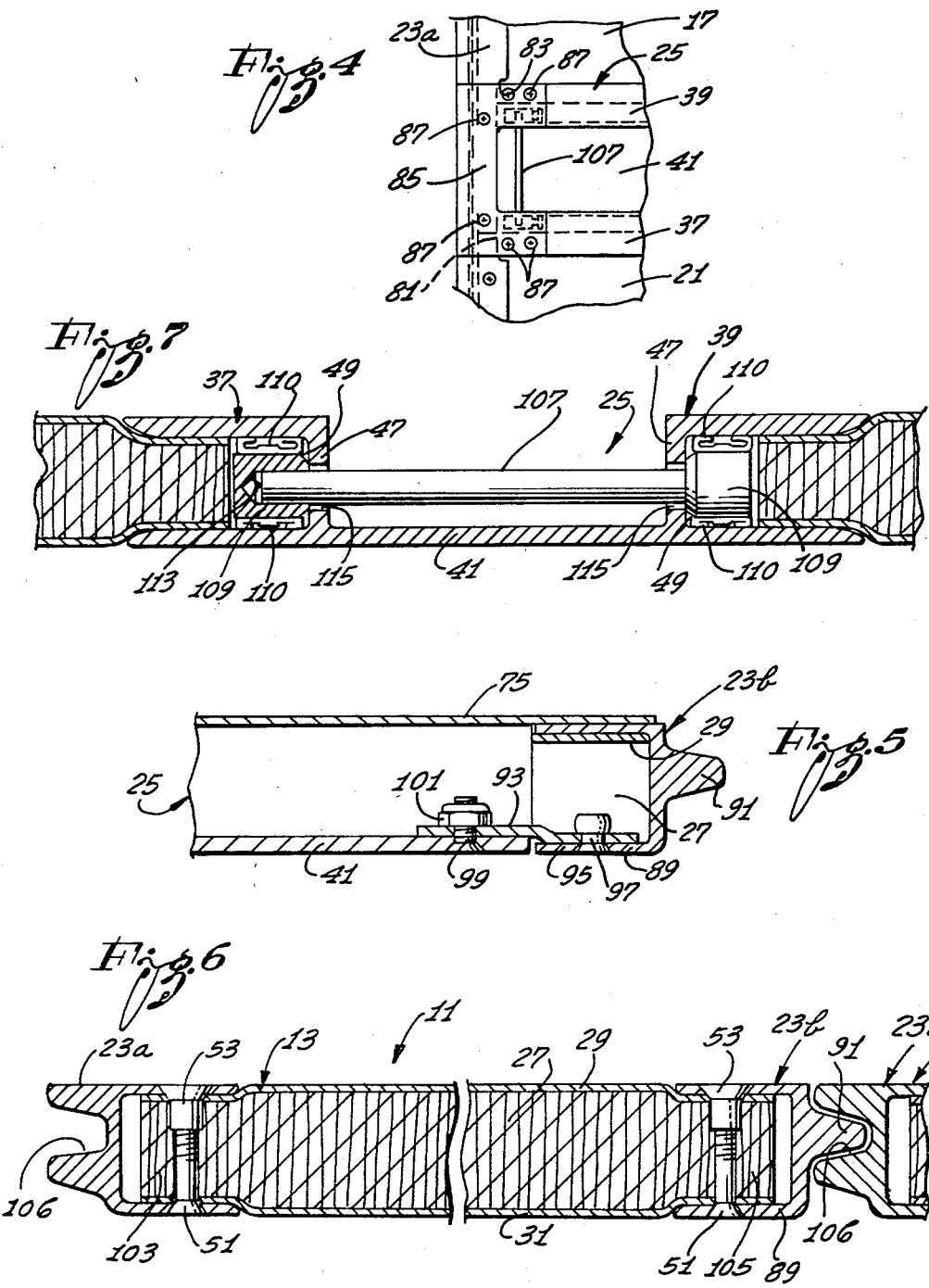

United States Patent Office 3,396,678
Patented Aug. 13, 1968

3,396,678
PALLET CONSTRUCTION
Richard H. Jensen, Los Angeles, Calif., assignor to Brownline Corporation, Redondo Beach, Calif., a corporation of California
Filed May 3, 1967, Ser. No. 635,736
11 Claims. (Cl. 108—51)

ABSTRACT OF THE DISCLOSURE

This disclosure describes an improved pallet construction of the type particularly adaptable for use as a seat pallet. In the specific embodiment described herein, the improved pallet includes a plurality of panels with each pair of adjacent panels interconnected by an elongated integral lock rail of simplified construction. Passenger seats can be mounted on the pallet with seat fittings which are mounted on the lock rails.

Background of the invention

To facilitate installation of passenger seats in aircraft, the seats are often palletized on a seat pallet. The seat pallet is loaded into the aircraft and directly secured to the floor structure of the aircraft by pallet locks.

It is common practice to construct seat pallets from several panels. The pallets are interconnected by lock rails and the periphery of the pallet is strengthened and protected by edging or edge members. The lock rails of the prior art are relatively complex structures and include several separate interconnecting elements separated by spacers. This construction is undesirably complex and increases the time required to assemble and disassemble the pallet.

Passenger seats are attached to the pallet by seat fittings. The seat fittings of prior art pallets form a part of the pallet itself. The problem with this construction is that if replacement of the seat fitting is required, it becomes necessary to disassemble the pallet to replace the old seat fitting with a new one. The necessity of disassembling the pallet to replace the seat fitting increases the time of replacement and the labor cost.

Prior art seat pallet construction is further complicated by the use of numerous balsa wood supports for supporting a cover plate which covers or partially covers the lock rails. In addition, gussets are used to keep the frame, which is defined by the lock rails and the edge members, square when the panels are removed therefrom.

Summary of the invention

The present invention achieves substantial simplification and weight reduction of seat pallet construction. To this end, the present invention teaches construction of the lock rail of the pallet as a unitary member thereby eliminating several of the separate elements of the prior art lock rail. The integral construction of this invention can be obtained in numerous ways; however, use of a light weight metal extrusion is preferred. The lock rail of this invention has edge embracing portions which may be channel-shaped in cross section. These channels are separated by a web integral therewith and the web and the webs of the channels define an upwardly opening recess. Preferably the lock rail is elongated and extends substantially the full length of the edge portions of the panels to which it is connected. Preferably the web of each of the channels is spaced from the edge of the adjacent panel to define an elongated cavity. The cavity may be used in mounting a pin to the lock rail which provides an anchor for a passenger seat.

To facilitate installation and removal of the seat fittings, the present invention teaches releasably attaching the seat fittings to the web of the lock rail. Thus, the seat fittings are disposed in the recess of the lock rail and access to the fasterners which attach the seat fitting to the web of the lock rail is easily obtained. With this construction, disassembly of the pallet is not necessary in removing or installing the seat fitting.

The upper end of the recess in the lock rail is covered by a cover plate. With the present invention, the cover plate is supported by the channels of the lock rail and by the upper end of the seat fitting. No special supports for the cover plate are necessary.

The panels, which form the major portion of the pallet are preferably of sandwich construction. Each of the panels preferably includes a core having face sheets adhered, or otherwise secured, to the opposed faces thereof. The face sheets are received within the channels of the lock rail and, therefore, the face sheets serve, in effect, as large gussets for rigidifying the pallet frame. No separate gussets are required for this purpose.

The panels are held together in spaced coplanar relationship by the lock rails. Edge members extend along the periphery of the pallet and span the space or gap between adjacent panels. It is desirable to secure the lock rail to that portion of the edge member which lies in immediate adjacent panels. In a preferred form, such connection includes a strong strap-like connector secured to an inner portion of the edge member and releasably attached to the web of the lock rail.

The invention, both as to its organization and method of operation together with further features and advantages thereof may best be understood by reference to the following description taken in connection with the accompanying illustrative drawings.

Brief description of the drawings

FIG. 1 is a top plan view of a seat pallet constructed in accordance with the teachings of this invention.

FIG. 2 is an enlarged fragmentary sectional view taken along line 2—2 of FIG. 1 and showing a typical lock rail and seat fitting.

FIG. 3 is an enlarged fragmentary plan view of a seat fitting and the surrounding portions of the lock rail.

FIG. 4 is an enlarged fragmentary plan view of an area of the pallet generally encircled by the arrow designated 4 in FIG. 1, and showing the connection of the aft end of the seat lock to the edge member.

FIG. 5 is an enlarged fragmentary sectional view taken along line 5—5 of FIG. 1 and showing the connection between the edging member and the forward end of the seat lock.

FIG. 6 is an enlarged sectional view taken along line 6—6 of FIG. 1 and illustrating the transversely extending tongue and groove on the opposed transverse edges of the seat pallet.

FIG. 7 is a fragmentary sectional view taken along line 7—7 of FIG. 1 and showing how a connector pin for a passenger seat is mounted on the lock rail.

Description of the specific embodiment

Referring to the drawings and particularly to FIG. 1 thereof, reference numeral 11 designates a seat pallet construction in accordance with the teachings of this invention. Generally, the seat pallet 11 includes a central panel 13, a pair of intermediate panels 15 and 17, and a pair of outer panels 19 and 21. Edging 23, which may include several individual edge members, extends completely around the periphery of the pallet 11 as shown diagrammatically in FIG. 1. Adjacent panels are interconnected by four identical lock rails 25.

The construction of the lock rail 25 can best be understood by reference to FIGS. 2 and 3. As shown in FIG. 2, each of the panels 13 and 17 is of sandwich construction and includes a core 27 preferably constructed of a light weight wod such as balsa wood or plywood and upper and lower facing sheets 29 and 31 adhered to the core 27. The facing sheets 29 and 31 may be constructed of any suitable material such as aluminum or phenolic. Each of the panels 13 and 17 has an inner or interior edge portion 33 of reduced thickness and terminates in an end surface 35. The face sheets 29 and 31 of each of the panels extend across their respective interior edge portions 33 and terminate at their respective end surfaces 35. Preferably this is made possible by compression of the edge portion 33 as described in common assignee's copending patent application Ser. No. 632,714, and entitled "Improved Panel Construction and Method." As shown in FIG. 2 both of the faces of the panels 13 and 17 are indented.

The lock rail 25 is an elongated substantially continuous extrusion of light weight metal such as aluminum. The lock rail 25 includes a pair of channels 37 and 39 separated by a web 41 integral therewith. Each of the channels 37 and 39 includes generally parallel flanges 43 and 45 separated by an integral web 47. The channels 37 and 39 embrace the edge portions 33 of the panels 17 and 13, respectively, with the flanges 43 and 45 engaging the facing sheets 29 and 31, respectively. As shown, the web 47 is spaced inwardly from the end surface 35 to define a generally square cavity 49. The channels 37 and 39 are secured to the edge portions 33 by flush mounted bolts 51 and nuts 53.

In the embodiment illustrated the web 41 is coplanar with the lower flanges 45 and the webs 41 and 47 define an upwardly opening channel-shaped cavity 55. A seat fitting 57 is securely and releasably attached to the web 41 by bolts 59 and nuts 61. The seat fitting may be constructed of a light weight metal and includes a pair of feet 63 resting on the web 41 and receiving the bolts 59, upright legs 65, and an elevated platform 67. The upright legs 65 and the platform 67 define a groove 68 having an elongated narrow slot portion 69 (FIG. 3) and a widened, substantially circular portion 71. Flanges 73 overhang the groove 68 as shown in FIG. 2. Thus, the seat fitting 57 is adapted to assist in mounting of a passenger seat (not shown) on the lock rail 25.

A cover plate 75 is secured by the nuts 53 to the lock rail 25 and is supported on the flanges 43 and on the upper surface 76 of the seat fitting 57. The cover plate 75 has a generally rectangular aperture 77 therein which lies above the groove 68 to expose a section of the slot portion 69 and the circular portion 71. An appropriate attachment member mounted on the passenger seat may be inserted through the aperture 77 into the groove 68.

As shown in FIG. 1 the lock rails 25 extend for the full length of the interior edge portions 33 of the adjacent panels. In the embodiment illustrated, two of the seat fittings 57 are mounted in each of the lock rails 25. Two of the cover plates 75 are mounted on each of the lock rails 25 with the cover plates being spaced to define a pair of exposed areas 79 along each of the lock rails 25 with one of the exposed areas 79 being located at the aft end of the lock rail. Each of the exposed areas 79 is adapted to receive a pallet lock (not shown) for securing the pallet 11 on the supporting floor structure of aircraft (not shown). All or a portion of the web 41 and of each of the lock rails 25 is preferably removed at each of the exposed areas 79 to allow the pallet lock to affix the pallet 11 to the floor structure of the aircraft.

FIG. 4 illustrates a typical connection for securing the aft end of one of the lock rails 25 to an edge member 23a thereadjacent. The lock rail 25 terminates in an aft end 81 and may be received in a notch 83 of the edge member 23a. A flat metal plate 85 is suitably affixed to the edge member 23a and to the channels 37 and 39 as by threaded fasteners 87 to thereby interconnect the aft end of the lock rail 25 to the edge member 23a.

FIG. 5 illustrates a preferred form of connection for interconnecting the forward end of the lock rail 25 to an edge member 23b. The edge member 23b has a U- or channel-shaped portion which embraces the peripheral edge portion of the pallet 11. The section of the edge member 23 shown in FIG. 5 lies intermediate and spans the gap between the adjacent panels 17 and 21. The edge member 23b includes a channel portion 89 embracing the peripheral edge portion of the pallet 11 and an elongated forwardly extending tongue 91 formed integrally with the channel portion 89. The cover plate 75 rests on the upper edge of the edge member 23b.

A strong metal strap-like connector or clip 93 is utilized to interconnect the lock rail 25 and the edge member 23b. As illustrated in FIG. 5, one end of the connector 93 is secured to the inner side of a lower flange 95 of the edge member 23b by a rivet 97 and, the other end of the connector is releasably attached to the upper side of the web 41 by a bolt 99 and a nut 101. The connector 93 may extend for substantially the full distance between the channels 37 and 39 of the lock rail 25. The connector 93 provides a strong easily disassembled connection between the lock rail 25 and the edge member 23b. The type of connection shown in FIG. 5 could be used to interconnect the aft end of the lock rail 25 to the edge member 23; however, in the embodiment illustrated, the web 43 adjacent the aft end 81 of the lock rail 25 is cut away to accommodate a pallet lock and, therefore, the connector 93 could not be attached to the web 41 at that point.

FIG. 6 illustrates the panel 13 and the edge members 23a and 23b which are affixed to aft and forward exterior edge portions 103 and 105, respectively. The edge portions 103 and 105 are of a reduced thickness and the facing sheets 29 and 31 extend thereover as described hereinabove in connection with FIG. 2. The reduction in thickness of the edge portions 103 and 105 may also be accomplished as taught herein with reference to FIG. 2. The aft edge member 23a is substantially identifal for the forward edge member 23b except that the former has a rearwardly opening transversely extending groove 107 which is adapted to loosely receive the tongue 91 of the forward edge member of the adjacent pallet. FIG. 6 shows an adjacent pallet 11' having a groove 106 receiving the tongue 91 of the pallet 11.

The tongue 91 and the groove 106 are provided to prevent articles which may be dropped onto the pallets from falling through any space or gap that may exist therebetween. It should be clearly understood that the tongue 91 and the groove 106 are not provided for structural purposes or for structurally interlocking adjacent pallets. As the pallet locks which are adapted to be positioned in the exposed areas 79 (FIG. 1) lock the pallet 11 to the floor structure of the aircraft and prevent relative movement therebetween, the tongue 91 and the groove 106 have no structural effect on the various loads that may be applied to the seat pallets.

FIG. 7 shows a pin 107 mounted on the lock rail 25. As shown, the pin 107 extends transversely of the lock rail and is used to assist in anchoring a passenger seat (not shown) on the lock rail 25. That is, the passenger seat may embody conventional hook means (not shown), for cooperating with the pin 107 to mount the seat on the lock rail 25. Several of the pins 107 are mounted on the lock rails 25 as shown in FIG. 1.

More particularly, each of the cavities 49 contains a mounting block 109. The mounting blocks 109 are suitably affixed to the channels 37 and 39, respectively, and have resilient pads 110 on the upper and lower surfaces thereof to prevent rattling. Each of the mounting blocks 109 is preferably relatively short and contains a bore 113 for receiving an end portion of the pin 107. The webs 47 of the channels 37 and 39 have apertures 115 through which the pin 107 passes. The mounting blocks 109 rigidly mount the pin 107 on the lock rail 25 in vertically spaced relationship to the web 41. With this arrangement, only the pin 107 is exposed and the mounting means for the pins is concealed within the channels 37 and 39.

Thus, the present invention provides a lock rail 25 which is a single piece of metal preferably an extrusion, thereby eliminating all unnecessary and separate elements of the lock rail. The seat fittings 57 can be easily removed by first removing the nuts 53 to allow removal of the cover plate 75 and then removing the several nuts 61 to allow removal of the seat fitting. Thus, the seat fitting 57 can be removed without disassembly of the pallet 11. As the face sheets 29 and 31 of the various separate panels extend beneath the edging 23 the facing sheets serve, in effect, as gussets for rigidifying the entire pallet frame and no separate gusset members for this purpose are required. Of course, the lock rails 25 may be easily disconnected from the edging 23 by disconnecting the fasteners 87 (FIG. 4) and the bolts 99 and the nuts 101 (FIG. 5).

Although an exemplary embodiment of the invention has been shown and described, many changes, modifications, and substitutions may be made by one having ordinary skill in the art without necessarily departing from the spirit and scope of this invention.

I claim:

1. In a pallet, the combination of:
   first and second relatively broad panels, each of said panels having generally opposed upper and lower faces, an exterior edge portion forming a marginal region of the pallet and an elongated interior edge portion extending into an inner region of the pallet, said panels being arranged with the interior edge portions thereof in spaced confronting relationship;
   an elongated integral lock rail interconnecting said panels along said interior edge portions thereof;
   said lock rail including first and second edge embracing portions embracing said interior edge portions of said first and second panels, respectively, and a web integral with and spacing said first and second edge embracing portions; and
   edge member means attached to said panels and extending along said exterior edge portions thereof.

2. A combination as defined in claim 1 wherein a seat fitting is mounted on said web and extends upwardly therefrom, said seat fitting being adapted to secure a passenger seat to the lock rail.

3. A combination as defined in claim 1 wherein each of said edge embracing portions includes a channel having a pair of flanges and said web is substantially coplanar with one flange of each of said pair of flanges.

4. A combination as defined in claim 1 wherein each of said interior edge portions includes an end surface and said first and second edge embracing portions are spaced from said end surfaces of said first and second panels, respectively, to define first and second cavities and including a pin extending across said lock rail and means at least partially within said cavities for mounting said pin on said lock rail whereby said pin is useful to mount a passenger seat on said lock rail.

5. A combination as defined in claim 1 wherein said lock rail is a light weight metal extrusion and said edge embracing portions and said web extend substantially continuously for substantially the full length of said interior edge portions of said panel.

6. A combination as defined in claim 1 wherein each of said panels are of sandwich construction and include a core and a pair of face sheets secured to said core, each of said edge embracing portions embracing portions of the face sheets and core of the adjacent panel.

7. In a pallet, the combination of:
   first and second relatively broad panels, each of said panels having generally opposed upper and lower faces, an exterior edge portion forming a marginal region of the pallet and an elongated interior edge portion extending into an inner region of the pallet, said panels being arranged with the interior edge portions thereof in spaced confronting relationship to define a gap between said panels;
   an elongated lock rail interconnecting said panels along the interior edge portions thereof, said lock rail extending along said interior edge portions of said panel for substantially the full length thereof;
   edge member means having a generally channel-shaped portion embracing the exterior edge portions of said panels and spanning the gap between said panels, said lock rail terminating at one end adjacent said channel-shaped portion of said edge member means; and
   a strong strap-like connector attached to said channel-shaped portion of said edge member means and to said one end of said lock rail.

8. A combination as defined in claim 7 wherein said strap-like connector is releasably attached to one of said edge member means and said lock rail, said lock rail has a web spacing said panels, and said strap-like connector being attached to said web and to the interior of said channel-shaped portion.

9. In a pallet, the combination of:
   first and second relatively broad panels, each of said panels having generally opposed upper and lower faces, an exterior edge portion forming a marginal region of the pallet and an elongated interior edge portion extending into said inner region of the pallet, said panels being arranged with the interior edge portions thereof in spaced confronting relationship;
   an elongated integral lock rail including a first portion of generally channel-shaped cross section embracing the interior edge portion of said first panel, a second portion of generally channel-shaped cross section embracing the interior edge portion of said second panel, and a web integral with the channel-shaped portions and spacing said channel-shaped portions, said web and at least a section of each of said channel-shaped portions defining an upwardly open recess;
   a seat fitting for mounting a seat releasably attached to said web; and
   edge member means attached to said panels and extending along said exterior edge portions thereof.

10. A combination as defined in claim 9 including cover plate means resting on said channel-shaped portions and a portion of said seat fitting, said cover plate means leaving a portion of said seat fitting exposed to allow said seat fitting to be used in attaching the seat to said lock rail.

11. A combination as defined in claim 9 wherein each of said channel-shaped portions of said lock rail include a pair of flanges separated by a spacer plate integral therewith, said spacer plate being spaced substantially from the interior edge portion of the associated panel.

References Cited

UNITED STATES PATENTS

| 2,640,669 | 6/1953 | Ashford | 108—53 XR |
| 2,876,969 | 3/1959 | Tydon et al. | 244—118 |
| 3,029,052 | 4/1962 | Early et al. | 108—57 |
| 3,090,331 | 5/1963 | McCann | 108—51 |
| 3,157,423 | 11/1964 | Brie | 108—56 XR |
| 3,251,322 | 5/1966 | Downs et al. | 108—58 |
| 3,298,327 | 1/1967 | Grimes | 108—57 |

BOBBY R. GAY, *Primary Examiner.*

G. FINCH, *Assistant Examiner.*